United States Patent
Yamada et al.

(10) Patent No.: US 6,849,689 B2
(45) Date of Patent: Feb. 1, 2005

(54) RUBBER-REINFORCED THERMOPLASTIC RESIN AND RUBBER-REINFORCED THERMOPLASTIC RESIN COMPOSITION

(75) Inventors: Gou Yamada, Tokyo (JP); Hiromu Akatsuka, Tokyo (JP); Takashi Kurata, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 0 days.

(21) Appl. No.: 10/105,631

(22) Filed: Mar. 26, 2002

(65) Prior Publication Data

US 2002/0188066 A1 Dec. 12, 2002

(30) Foreign Application Priority Data

Mar. 28, 2001 (JP) ........................................ 2001-093702

(51) Int. Cl.[7] .......................... C08L 51/00; C08L 53/00
(52) U.S. Cl. .............................. 525/71; 525/73; 525/85; 525/87
(58) Field of Search ............................. 525/71, 73, 85, 525/87

(56) References Cited

U.S. PATENT DOCUMENTS

| 4,463,130 A | | 7/1984 | Serini et al. | |
|---|---|---|---|---|
| 4,753,988 A | * | 6/1988 | Henton et al. | ................. 525/73 |
| 4,766,175 A | * | 8/1988 | Henton | ........................ 525/71 |
| 4,868,235 A | | 9/1989 | Muehlbach et al. | |
| 5,112,895 A | * | 5/1992 | Chen et al. | .................. 524/308 |
| 5,679,759 A | | 10/1997 | Wittmann et al. | |

FOREIGN PATENT DOCUMENTS

| EP | 0 375 648 | 6/1990 |
|---|---|---|
| EP | 0 937 747 A2 | 8/1999 |
| EP | 0 953 604 A2 | 11/1999 |
| EP | 1 022 312 A1 | 7/2000 |
| EP | 1 142 957 A2 | 10/2001 |

* cited by examiner

*Primary Examiner*—Jeffrey Mullis
(74) *Attorney, Agent, or Firm*—Nixon & Vanderhye P.C.

(57) ABSTRACT

Rubber-reinforced thermoplastic resins containing a copolymer resin (A1) obtained by polymerizing a vinyl monomer (b1) in the presence of an acrylic rubber-like polymer (a), or a mixture of copolymer resin (A1) and a (co)polymer (A2) of a vinyl monomer (b2).

Acrylic rubber-like polymer (a) contains 50 to 98% by weight of acrylic rubber-like polymer particles (a1) which have a particle size of less than 350 nm and 2 to 50% by weight of acrylic rubber-like polymer particles (a2) which have a particle size of not less than 350 nm.

The amount of the acrylic rubber-like polymer (a) is 5 to 80% by weight based on the rubber-reinforced thermoplastic resin.

9 Claims, No Drawings

RUBBER-REINFORCED THERMOPLASTIC RESIN AND RUBBER-REINFORCED THERMOPLASTIC RESIN COMPOSITION

BACKGROUND OF THE INVENTION

The present invention relates to a rubber-reinforced thermoplastic resin and a rubber-reinforced thermoplastic resin composition. More particularly, it relates to a rubber-reinforced thermoplastic resin which has been reinforced with an acrylic rubber-like polymer and which can provide the molded articles having excellent impact resistance, weather resistance and surface appearance; and a rubber-reinforced thermoplastic resin composition comprising the said rubber-reinforced thermoplastic resin and other non-diene rubber-reinforced thermoplastic resin, which composition is capable of providing the molded articles having a high-level balance of impact resistance, weather resistance and surface appearance. The rubber-reinforced thermoplastic resin and the rubber-reinforced thermoplastic resin composition according to the present invention can be used for the parts, chassis, housings, etc., of various industrial products such as OA equipment, household electrical appliances, products in the electric and electronic fields, miscellaneous goods, sanitary products, vehicles, etc.

ABS resins using diene rubber-like polymers as rubber moiety, AES resins using ethylene-propylene rubber, and ASA resins using acrylic ester rubber have been widely known as rubber-reinforced thermoplastic resins.

The diene rubber used in the said ABS resins as rubber moiety has an unsaturated double bond in the molecular chain. The molded articles of these ABS resins have such disadvantage that when these articles are exposed to sunlight in outdoor use, there may take place oxidation or severance of molecular chain at the unsaturated double bond portion of the rubber moiety, causing discoloration and deterioration of properties of the articles. Therefore, outdoor use of the molded articles comprising ABS resins has been limited. Certain improvement for such use may be provided by adding an ultraviolet absorber, light stabilizer, antioxidant or such to the resin, but this can not provide total elimination of the said defect of the ABS resins.

In an attempt to overcome the said defect of ABS resins, many proposals have been made on the techniques using saturated rubber containing no unsaturated bond in the molecular chain. AES and ASA resins are superior to ABS resins in respect of weather resistance, and they have already been put to practical use as a molding material for the products for outdoor use. The molded articles using AES resins, however, are inferior to those of ASA resins in visual appearance, while ASA resins are inferior to AES resins in impact strength. So, there has been a demand for providing a weather resistant resin which has high impact strength and also excels in surface appearance of its molded products. When the expression "excels in surface appearance" is used here, it means that the molded article has a surface having excellent gloss, free of flow marks and segregation, and also having good colorability.

For the improvement of qualities of the said ASA resins, methods are known in which a diene rubber is incorporated in an acrylic rubber-like polymer, or an ABS resin is blended in an ASA resin. The molded products obtained by utilizing these methods are indeed improved in impact resistance, but they are unsatisfactory in surface appearance and weather resistance.

SUMMARY OF THE INVENTION

An object of the present invention is to provide a rubber-reinforced thermoplastic resin which is improved in impact resistance and weather resistance without compromising the surface appearance of the molded or fabricated articles, and a rubber-reinforced thermoplastic resin composition which is capable of providing the molded articles having a high-level balance of surface appearance, impact resistance and weather resistance.

As a result of the present inventors' earnest studies to solve the above problem, it has been found that the above problem can be solved by incorporating an acrylic rubber-like polymer in the base resin, with the size and amount of the said polymer being defined within the specified ranges.

To attain the above aim, in the first aspect of the present invention, there is provided a rubber-reinforced thermoplastic resin comprising a copolymer resin (A1) obtained by polymerizing a vinyl monomer (b1) in the presence of an acrylic rubber-like polymer (a), or a mixture of said copolymer resin (A1) and a (co)polymer (A2) of a vinyl monomer (b2), said acrylic rubber-like polymer (a) comprising 50 to 98% by weight of acrylic rubber-like polymer particles (A1) which have a particle size of less than 350 nm and 2 to 50% by weight of acrylic rubber-like polymer particles (a2) which have a particle size of not less than 350 nm, and the content of said acrylic rubber-like polymer (a) being 5 to 80% by weight based on said rubber-reinforced thermoplastic resin.

In the second aspect of the invention, there is provided a rubber-reinforced thermoplastic resin comprising a copolymer resin (A3) containing an acrylic rubber-like polymer (f) obtained by polymerizing a vinyl monomer (b) in the presence of an acrylic rubber-like polymer (a), the content of said acrylic rubber-like polymer (a) being 5 to 80% by weight, and the weight ratio (wt %) of the particles of said acrylic rubber-like polymer (f) being defined as: (particles having a particle size of less than 350 nm)/(particles having a particle size of not less than 350 nm)=(50 to 98)/(2 to 50).

In the third aspect of the invention, there is provided a rubber-reinforced thermoplastic resin composition comprising the rubber-reinforced thermoplastic resin (I) as defined in the first aspect or second aspect and a non-diene rubber-like polymer-reinforced thermoplastic resin (II) excluding the resin of (I), the content of the acrylic rubber-like polymer in the rubber-reinforced thermoplastic resin (I) being 1 to 40% by weight, and the content of the non-diene rubber-like polymer in the none-diene rubber-like polymer-reinforced thermoplastic resin (II) being 1 to 40% by weight.

In the fourth aspect of the invention, there is provided a rubber-reinforced thermoplastic resin comprising a copolymer resin (A1) obtained by polymerizing a vinyl monomer (b1) in the presence of an acrylic rubber-like polymer (a), or a mixture of said copolymer resin (A1) and a (co)polymer (A2) of a vinyl monomer (b2), said acrylic rubber-like polymer (a) comprising 50 to 98% by weight of acrylic rubber-like polymer particles (a1) which have a particle size of less than 350 nm and 2 to 50% by weight of acrylic rubber-like polymer particles (a2) which have a particle size of not less than 350 nm, the content of said acrylic rubber-like polymer (a) being 5 to 80% by weight based on said rubber-reinforced thermoplastic resin, said vinyl monomer (b2) containing a maleimide monomer in an amount of 5 to 65% by weight based on the overall amount of said vinyl monomer (b2), the weight-average size of said acrylic rubber-like polymer particles (a1) being 60 to 200 nm, the weight-average size of said acrylic rubber-like polymer particles (a2) being 400 to 2000 nm, and the content of the acrylic rubber-like polymer particles having a size of 300 to 400 nm in the acrylic rubber-like polymer (a) being not more than 20% by weight when the content of the whole acrylic rubber-like polymer particles is supposed to be 100% by weight.

DETAILED DESCRIPTION OF THE INVENTION

The present invention is explained in more detail.

First, the rubber-reinforced thermoplastic resin in the first aspect of the present invention is explained. The rubber-reinforced thermoplastic resin according to the first aspect of the present invention comprises a copolymer resin (A1) obtained by polymerizing a vinyl monomer (b1) in the presence of an acrylic rubber-like polymer (a), or a mixture of the said copolymer resin (A1) and a (co)polymer of a vinyl monomer (b2).

The said acrylic rubber-like polymer (a) is not specifically defined, but it is preferably a (co)polymer of a (meth)acrylic acid alkyl ester (alkyl(meth)acrylate) monomer in which the carbon number of the alkyl group is 1 to 8, or a copolymer of the said (meth)acrylic alkyl ester monomer and a vinyl monomer copolymerizable therewith.

Examples of the vinyl monomers copolymerizable with the said (meth)acrylic alkyl ester monomer include polyfunctional vinyl monomers, aromatic vinyl monomers and vinyl cyanide monomers.

Examples of the above-mentioned alkylacrylate having $C_1-C_8$ alkyl group include methyl acrylate, ethyl acrylate, propyl acrylate, n-butyl acrylate, i-butyl acrylate, amyl acrylate, hexyl acrylate, n-octyl acrylate, 2-ethylhexyl acrylate and cyclohexyl acrylate. Examples of alkylmethacrylate include methyl methacrylate, ethyl methacrylate, propyl methacrylate, n-butyl methacrylate, i-butyl methacrylate, amyl methacrylate, hexyl methacrylate, n-octyl methacrylate, 2-ethylhexyl methacrylate and cyclohexyl methacrylate. Of these compounds, n-butyl acrylate and 2-ethylhexyl acrylate are preferred. These compounds may be used alone or as a mixture of two or more.

The "polyfunctional vinyl monomers" mentioned above are the monomers having two or more vinyl groups in the molecule, which have a function to crosslink the (meth)acrylic copolymers and serve as the starting point of the reaction for graft polymerization. Examples of such polyfunctional vinyl monomers include polyfunctional aromatic vinyl monomers such as divinylbenzene and divinyltoluene, (meth)acrylic esters of polyhydric alcohols such as (poly)ethylene glycol dimethacrylate and trimethylolpropane triacrylate, diallyl malate, diallyl fumarate, triallyl cyanurate, triallyl isocyanurate, diallyl phthalate, and allyl methacrylate. These polyfunctional vinyl monomers may be used either singly or as a combination of two or more.

As the above-mentioned aromatic vinyl compound, there can be exemplified styrene, p-methylstyrene, o-methylstyrene, m-methylstyrene, t-butylstyrene, α-methylstyrene, 1,1-diphenylstyrene, N,N-diethyl-p-aminostyrene, N,N-diethyl-p-aminomethylstyrene, vinylpyridine, vinylxylene, monochlorostyrene, dichlorostyrene, monobromostyrene, dibromostyrene, tribromostyrene, fluorostyrene, ethylstyrene, vinylnaphthalene. These compounds may be used alone or as a mixture of two or more.

As the above-mentioned vinyl cyanide compound, acrylonitrile and methacrylonitrile are exemplified. These compounds may be used alone or as a mixture of two or more.

As the above-mentioned other monomer copolymerizable with the above (meth)alkylacrylate, acrylamide, methacrylamide, vinylidene chloride, alkylvinylether having $C_1-C_6$ alkyl group, alkyl(meth)acrylate having an alkyl group whose carbon number is not less than 9 and (meth)acrylic acid are exemplified. These compounds may be used alone or as a mixture of two or more.

The monomeric units of the said acrylic rubber-like polymer are preferably of the following composition: 80 to 99.99% by weight, more preferably 90 to 99.5% by weight of the unit of the (meth)acrylic alkyl ester monomer in which the carbon number of the alkyl group is preferably 1 to 8, 0.01 to 5% by weight, more preferably 0.1 to 2.5% by weight of the unit of the polyfunctional vinyl monomer, and preferably 0 to 20% by weight, more preferably 0 to 10% by weight of the unit of the other vinyl monomer copolymerizable with the said alkyl ester monomer, in which the total of the percents of the respective monomeric units is 100% by weight.

If the content of the said (meth)acrylic alkyl ester monomer unit is too low (below the above-defined range), the produced resin may be low in impact resistance at low temperatures. If the content of the said polyfunctional vinyl monomer unit is too low, the degree of crosslinkage of the acrylic rubber-like polymer (a) may become low, resulting in reduced rubber elasticity. Also, the rubber particles in the molded article obtained by using the produced resin may be deformed excessively, making it unable to demonstrate their impact resistance to a satisfactory extent, consequently inducing anisotropy in the molded article. Further, the starting points of the graft polymerization reaction may be lessened to cause unsatisfactory grafting. On the other hand, if the content of the said polyfunctional vinyl monomer unit is too high (over the above-defined range), the degree of crosslinkage of the acrylic rubber-like polymer (a) may heighten excessively, causing the resin to loose its rubber elasticity and become stiffened. If such stiffened rubber is used, the molded article obtained by using the produced rubber-reinforced thermoplastic resin may be low in impact resistance.

A too low content of the other copolymerizable vinyl monomer unit may deteriorate the various properties, such as modulus of elasticity, of the acrylic rubber-like polymer (a).

The said acrylic rubber-like polymer (a) may be used alone or in combination with other acrylic rubber-like polymer(s) differing in composition (type and amount of the monomers, etc.).

The said acrylic rubber-like polymer (a) comprises 50 to 98% by weight, preferably 55 to 97% by weight, more preferably 60 to 97% by weight of the acrylic rubber-like polymer particles (a1) having a particle size of less than 350 nm, and 2 to 50% by weight, preferably 3 to 45% by weight, more preferably 3 to 40% by weight of the acrylic rubber-like polymer particles (a2) having a particle size of not less than 350 nm, with the total of the percents of the respective components being 100% by weight. If the content of the said particles (a1) is too low or the content of the particles (a2) is too high, the molded article of the rubber-reinforced thermoplastic resin obtained after grafting may deteriorate in surface appearance. If the content of the said particles (a1) is too high or the content of the particles (a2) is too low, the molded article of the rubber-reinforced thermoplastic resin obtained after grafting may deteriorate in impact resistance.

The content of the acrylic rubber-like polymer particles with a size of 300 to 400 nm in the said acrylic rubber-like polymer (a) is preferably not more than 20% by weight, more preferably not more than 15% by weight, even more preferably not more than 10% by weight, when the content of the whole polymer particles is supposed to be 100% by weight. If the content of the said rubber-like polymer particles is confined within the above-defined range, the properties of the molded article obtained from the rubber-reinforced thermoplastic resin of the present invention is further improved.

The weight-average size of the acrylic rubber-like polymer particles (a1) having a size of less than 350 nm is preferably 60 to 200 nm, more preferably 70 to 190 nm, even more preferably 80 to 180 nm, and the weight-average size of the acrylic rubber-like polymer particles (a2) having a size of not less than 350 nm is preferably 400 to 2,000 nm, more preferably 450 to 1,700 nm, even more preferably 500 to 1,500 nm. The weight-average size of the whole acrylic rubber-like polymer particles is preferably 150 to 700 nm, more preferably 180 to 650 nm, even more preferably 200 to 650 nm. If the weight-average sizes of the acrylic rubber-like polymer particles (a1) and (a2) are within the above-defined ranges, there can be obtained a rubber-reinforced thermoplastic resin further improved in the objective performance.

The glass transition temperature (Tg) of the said acrylic rubber-like polymer is preferably not higher than 10° C., more preferably not higher than 0° C., even more preferably not higher than −10° C. If the Tg is too high, the molded article may be low in impact resistance.

The gel content of the said acrylic rubber-like polymer is preferably 20 to 99% by weight, more preferably 30 to 98.5% by weight, even more preferably 40 to 98% by weight. If the gel content is too low, rubber elasticity of the produced resin may lower, resulting in reduced impact resistance of the molded article obtained by using such a resin. On the other hand, if the gel content is too high, rubber elasticity may heighten to cause a reduction of fluidity of the produced resin. Here, the "gel content" is the value calculated from the following equation by adding dropwise a latex of the acrylic rubber-like polymer into an aqueous solution of an inorganic salt such as calcium carbonate or magnesium sulfate, drying the coagulated polymer in vacuo at a temperature between room temperature and 40° C., immersing the accurately weighed amount of the polymer (Pg) in approximately 25 ml of toluene with stirring at room temperature for 3 hours, subjecting the whole amount to centrifugation, and precisely measuring the dry weight of the obtained insoluble matter (Qg).

$$\text{Gel content (wt \%)}=(Qg/Pg)\times 100$$

The said gel content can be adjusted by properly selecting the type and amount of the molecular weight modifier, which is used in the preparation of the acrylic rubber-like polymer, and/or the polyfunctional vinyl monomer added in the resin production. Also, in case, for instance, where the polymer is prepared by emulsion polymerization, the gel content can be adjusted by controlling the amount of the polymerization initiator used, polymerization temperature, etc. These adjusting methods may be applied as a suitable combination.

The said acrylic rubber-like polymer is preferably produced by a known emulsion polymerization method using water as medium.

For the emulsion polymerization, there can be used, for instance, a method in which the monomers are supplied and polymerized all at one time, or a method in which part of the monomers is polymerized first, and then the remainder is added either continuously or intermittently. The polymerization is carried out at preferably 40 to 90° C., more preferably 50 to 90° C., for a period of usually 3 to 10 hours.

In case where the acrylic rubber-like polymer is prepared by emulsion polymerization, it is possible to use where necessary a polymerization initiator, an emulsifier, a molecular weight modifier and an electrolyte.

As the polymerization initiator, there can be used the water-soluble polymerization initiators such as potassium persulfate, sodium persulfate and ammonium persulfate, oil-soluble polymerization initiators such as benzoyl peroxide, lauryl peroxide and 2,2'-azobisisobutyronitrile, which have been commonly used in the production of this type of rubber, and the redox type initiators comprising combinations of the above-said initiators and the reducers of sugar-containing pyrophosphoric acid formulations or sulfoxylate formulations. These polymerization initiators may be used either independently or as a combination of two or more. Among the above-mentioned polymerization initiators, sodium persulfate, potassium persulfate and ammonium persulfate are preferred. The polymerization initiator(s) is used in an amount of usually 0.1 to 1.5% by weight based on the whole amount of the monomers. As for the way of addition of the polymerization initiator(s), it is possible to use, for example, a method in which the whole amount of the initiator(s) is supplied at one time, or part of the initiator(s) is first added, and then the remainder is added continuously or intermittently, or a method in which the initiator(s) is added continuously from the start of the polymerization.

As the emulsifier, it is possible to use those which have been commonly used in the production of this type of rubber. Examples of such emulsifiers include alkaline metal salts of higher fatty acids such as disproportionated rhodinic acid, oleic acid, lauric acid and stearic acid; alkaline metal salts of sulfonic acids such as dodecylbenzenesulfonic acid; anionic surfactants such as alkaline metal salts of dibasic acids such as alkenylsuccinic acid; nonionic surfactants of ordinary alkyl ester type, alkyl ether type or alkyl phenyl ether type of polyethylene glycol; and ampholytic surfactants having a carboxylate, sulfuric ester salt, sulfonate or phosphoric ester salt as anionic moiety and an amine salt or quaternary ammonium salt as cationic moiety. Examples of such ampholytic surfactants include betains such as laurylbetain and stearybetain, and amino type such as lauryl-β-alanine, stearyl-β-alanine, lauryldi (aminoethyl) glycine and octidyl (aminoethyl)glycine. It is also possible to use the reactive emulsifiers, for example, those having polymerizable unsaturated bonds with high reactivity such as vinyl group, acryloyl group, methacryloyl group, allyl group, allylether group and propenyl group. Among the above-mentioned emulsifiers, disproportionated rhodinic acid, oleates, laurates and reactive emulsifiers are preferred. These emulsifiers may be used either singly or as a combination of two or more. The amount of the emulsifier(s) used is usually 1 to 5% by weight based on the whole amount of the monomers. As for the method of addition of the emulsifier, for example, the whole amount of the emulsifier may be added at one time, or part of the emulsifier may be added first, with the remainder being then added continuously or intermittently.

As the molecular weight modifier, it is possible to use the conventional ones, for example, halogenated hydrocarbons such as chloroform and carbon tetrabromide; mercaptans such as n-hexylmercaptan, n-octylmercaptan, n-dodecylmercaptan, t-dodecylmercaptan and thioglycol; xanthogenes such as dimethylxanthogene disulfide and diisopropylxanthogene disulfide; terpinolene, and α-methylstyrene dimers. The molecular weight modifier is used in an amount of usually 0 to 1% by weight based on the whole amount of the monomers.

As the electrolyte, those conventionally used, such as potassium sulfate, potassium carbonate, sodium carbonate, potassium hydroxide, sodium hydrogencarbonate, sodium pyrophosphate and potassium phosphate can be used. These compounds may be used either singly or as a combination of two or more. The amount of the electrolyte used is usually 0 to 2% by weight based on the whole amount of the monomers. The molecular weight modifier and electrolyte, as in the case of the aforementioned emulsifier and polymerization initiator, may be supplied in portions or all at one time together with part or whole of the monomers, with the remainder being supplied in accordance with the progress of the copolymerization.

The amount of water used in the emulsion polymerization is preferably 100 to 200 parts by weight, more preferably 120 to 160 parts by weight based on 100 parts by weight of the monomers. If water is scanty, viscosity of the acrylic rubber-like polymer latex may increase, while use of water in excess may lead to poor economy. Water may be added all at one time, or part of water may be added initially, with the remainder being added continuously or intermittently.

As the acrylic rubber-like polymer (a) used for the preparation of the rubber-reinforced thermoplastic resin in the first aspect of the present invention, those having a characteristic particle size distribution are used. It is possible to obtain an acrylic rubber-like polymer having the objective particle size distribution from the said particles (a1) and (a2) by properly selecting the type and amount of the initiator and emulsifier used, and reaction temperature and time. For the adjustment of the particle size distribution, the monomeric materials are reacted in a state where the initiator and emulsifier are allowed to exist only in small quantities in the early phase of emulsification polymerization to form the particles (a2) which are large in size, and in the course of the polymerization, the initiator and emulsifier are further supplied to form the particles (a1) small in size.

The copolymer resin (A1) used in the present invention can be obtained by graft polymerizing a vinyl monomer (b1) in the presence of an acrylic rubber-like polymer (a).

As the said vinyl monomer (b1), which is not specifically defined in the present invention, there can be used, for instance, (meth)acrylic acid alkyl esters, aromatic vinyl monomers, polyfunctional aromatic vinyl monomers and vinyl cyanide monomers, which were mentioned before as the materials usable for the said acrylic rubber-like polymer, as well as unsaturated acids, unsaturated acid anhydrides, maleimide monomers, epoxy group-containing unsaturated compounds, unsaturated carboxylic acid amides, amino group-containing unsaturated compounds, hydroxyl group-containing unsaturated compounds, oxazoline group-containing unsaturated compounds and the like.

As the above-mentioned unsaturated acids, acrylic acid and methacrylic acid are exemplified.

As the above-mentioned unsaturated anhydride, maleic anhydride, itaconic anhydride and citraconic anhydride are exemplified.

As the above-mentioned maleimide-based compounds, N-alkylmaleimde having $C_1$–$C_4$ alkyl group, N-phenylmaleimide, N-(p-methylphenyl)maleimide, and N-cyclohexylmaleimide. Of these compounds, N-phenylmaleimide and N-cyclohexylmaleimide are exemplified.

As the above-mentioned unsaturated compounds containing epoxy groups, glycidyl methacrylate and allylglycidyl ether are exemplified.

As the above-mentioned unsaturated compounds containing epoxy groups, glycidyl methacrylate and allylglycidyl ether are exemplified.

As the above-mentioned unsaturated compounds containing hydroxy groups, 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate and hydroxystyrene are exemplified.

As the above-mentioned unsaturated compounds containing oxazoline groups, vinyloxazoline is exemplified.

Among the above-mentioned substances, (meth)acrylic acid alkyl esters, aromatic vinyl monomers, vinyl cyanide monomers and maleimide monomers are preferably used. These substances may be used alone or as a combination of two or more, the latter case being preferred. Use of an aromatic vinyl monomer such as styrene conduces to the improvement of moldability of the rubber-reinforced thermoplastic resin of the present invention, and use of a vinyl cyanide monomer improves chemical resistance, impact resistance and compatibility with the polymers having polarity. Also, use of a maleimide monomer contributes to the improvement of heat deformation properties of the resin. The method of forming the copolymer resin (A1) containing the maleimide monomeric units is not limited to the use of the said maleimide monomers; it is also possible to introduce the maleimide monomeric units by copolymerizing maleic anhydride and then imidating the polymerizate.

In case where two or more of the above-exemplified vinyl monomers (b1) are used in combination, their ratios (with the total amount of the monomers used being supposed to be 100% by weight) are as follows: aromatic vinyl monomer (b1-1), preferably 5 to 60% by weight, more preferably 15 to 50% by weight; (meth)acrylic alkyl ester monomer (b1-2) in which the carbon number of the alkyl group is 1 to 12, preferably 0 to 55% by weight, more preferably 0 to 45% by weight; maleimide monomer (b1-3), preferably 0 to 65% by weight, more preferably 0 to 60% by weight; vinyl cyanide monomer (b1-4), preferably 0 to 40% by weight, more preferably 0 to 35% by weight; other copolymerizable vinyl monomer (b1-5), preferably 0 to 45% by weight, more preferably 0 to 25% by weight. In case, for instance, where maleic anhydride is copolymerized and then imidated, it is merely required that the content of the maleimide monomeric unit after imidation be in the above-defined range.

In case of using two or more of the above-mentioned vinyl monomers (b1), the lower limit of the amount of each monomer blended is preferably not less than 5% by weight, more preferably not less than 10% by weight. If its amount is less than 5% by weight, each monomer may be unable to exhibit its normal performance.

The preferred combinations of the ratios of the acrylic rubber-like polymer (a) and the vinyl monomer (b1) used for the copolymer resin (A1) are as follows (with the total of the ratios of (a) and (b1) being supposed to be 100% by weight): (a) is 5 to 80% by weight and (b1) is 20 to 95% by weight, more preferably (a) is 5 to 70% by weight and (b1) is 30 to 95% by weight, even more preferably (a) is 10 to 60% by weight and (b1) is 40 to 90% by weight. If the ratio of (a) is too low (below 5%) or if the ratio of (b1) is too high (above 95%), impact strength of the molded article may deteriorate. On the other hand, if the ratio of (a) is too high (above 80%) or if the ratio of (b1) is too low (below 20%), surface appearance and hardness of the molded article may deteriorate.

The graft ratio of the copolymer resin (A1), viz. the ratio of the vinyl monomer (b1) grafted to the acrylic rubber-like polymer (a), is preferably not less than 5% by weight, more preferably 10 to 200% by weight, even more preferably 10 to 150% by weight. If the graft ratio is too small (less than 5%), surface appearance of the molded article may deteriorate, while a too large graft ratio may lead to reduced impact resistance of the molded article. The method of determination of the graft ratio will be explained in the Examples given later.

This graft ratio can be easily controlled by properly selecting the type and amount of the polymerization initiator, emulsifier and molecular weight modifier used in the preparation of the copolymer resin (A1), as well as polymerization time, polymerization temperature and/or other relating factors.

The copolymer resin (A1) can be produced by polymerizing the said vinyl monomer (b1) preferably by emulsion polymerization, emulsion-suspension polymerization, emulsion-bulk polymerization, emulsion-solution polymerization or micro-suspension polymerization. In case of using emulsion polymerization, it is possible to use where necessary the above-mentioned polymerization initiator, emulsifier, molecular weight modifier and electrolyte. When emulsion-suspension polymerization is used, a suspending agent commonly used for this type of graft polymerization can be used.

As for the way of feeding the vinyl monomers, polymerization initiator, molecular weight modifier and other additives into the reactor when carrying out graft polymerization, they may be fed either all at one time or in portions (divided feed) or continuously (continuous feed). In the case of divided feed or continuous feed, the feed rate may be varied properly. Beside the emulsion polymerization method, there can be also used, for instance, a method in which graft polymerization is first carried out to a limited degree by emulsion polymerization, then the surfaces of the acrylic rubber-like polymer particles are coated with a hard resin, and when it became possible to conduct dispersion with the rubber particles alone, the polymerization system is shifted from emulsion to suspension, bulk or solution, and graft polymerization is continued.

In the copolymer resin (A1) produced in the manner described above is contained the (co)polymer of the ungrafted portion of the vinyl monomer (b1). That is, the copolymer resin (A1) may be a mixture of the graft copolymer and the (co)polymer of the vinyl monomer (b1).

The copolymer resin (A1) is not limited to the one obtained by polymerizing a vinyl monomer (b1) in the presence of an acrylic rubber-like polymer (a) containing the acrylic rubber-like polymers (a1) and (a2) as described above; it is also possible to use a resin preparation obtained by properly mixing two or more copolymer resins obtained by polymerizing a vinyl monomer (b1) in the presence of the acrylic rubber-like polymers differing in particle size, in a way to satisfy the requirements of the copolymer resin (A1).

The rubber-reinforced thermoplastic resin in the first aspect of the present invention may either comprise the said copolymer resin (A1) alone or may comprise a mixture of the copolymer resin (A1) and a (co)polymer (A2) of a vinyl monomer (b2). In the latter case, as the vinyl monomer (b2), it is possible to use the aromatic vinyl monomers, vinyl cyanide monomers, (meth)acrylic acid alkyl ester monomers, maleimide monomers and unsaturated carboxylic acids which were mentioned before as examples of the vinyl monomer (b1). The vinyl monomer (b2) may be of the same composition as or of the different composition from the vinyl monomer (b1). Also, the monomers (b2) such as cited above may be used alone or as a combination of two or more. Preferably, two or more of these monomers (b2) are used in combination. More preferably, at least two monomers selected from the group consisting of aromatic vinyl monomers, vinyl cyanide monomers, (meth)acrylic alkyl ester monomers and maleimide monomers are used.

The vinyl monomer (b2) used for forming the (co)polymer (A2) comprises preferably 10 to 60% by weight, more preferably 15 to 50% by weight of an aromatic vinyl monomer (b2-1), preferably 0 to 55% by weight, more preferably 0 to 45% by weight of a (meth)acrylic alkyl ester monomer (b2-2) in which the carbon number of the alkyl group is 1 to 12, preferably 0 to 65% by weight, more preferably 0 to 60% by weight of a maleimide monomer (b2-3), preferably 0 to 40% by weight, more preferably 0 to 35% by weight of a vinyl cyanide monomer (b2-4), and preferably 0 to 45% by weight, more preferably 0 to 25% by weight of other copolymerizable vinyl monomer (b2-5), with the total of the percents of the respective monomers being supposed to be 100% by weight.

In case of using, for instance, a maleimide monomer (b2-3), its amount contained is more preferably 5 to 65% by weight, especially 5 to 60% by weight, for maximizing the effect of use of this monomer. When the said respective component monomers are contained in the amounts in the above-defined ranges, the molded article obtained by using the produced rubber-reinforced thermoplastic resin or rubber-reinforced thermoplastic resin composition has good fabricability such as high melt adhesiveness. The maleimide monomeric unit can be incorporated in the same way as described above.

The (co)polymer (A2) can be a combination of plural polymers.

In case where the rubber-reinforced thermoplastic resin in the first aspect of the present invention contains a mixture of a copolymer resin (A1) and a (co)polymer (A2), their ratios in the resin are selected such that (A1) is preferably 10 to 99% by weight, more preferably 15 to 95% by weight, and (A2) is preferably 1 to 90% by weight, more preferably 5 to 85% by weight, with (A1)+(A2)=100% by weight.

Now, the rubber-reinforced thermoplastic resin according to the second aspect of the present invention is explained.

This rubber-reinforced thermoplastic resin comprises a copolymer resin (A3) which can be produced in the same way as the copolymer resin (A1) used in the first aspect of the present invention. This copolymer resin (A3) contains the acrylic rubber-like polymer particles (f) obtained by polymerizing a vinyl monomer (b) in the presence of an acrylic rubber-like polymer (a).

The said acrylic rubber-like polymer particles (f) contained in the copolymer resin (A3) consist of 50 to 98% by weight, preferably 60 to 97% by weight of the acrylic rubber-like polymer particles (f1) having a size of less than 350 nm and 2 to 50% by weight, preferably 3 to 40% by weight of the acrylic rubber-like polymer particles (f2) having a size of not less than 350 nm. The content of the particles having a size of 300 to 400 nm in the acrylic rubber-like polymer particles (f) is preferably not more than 20% by weight, more preferably not more than 15% by weight, even more preferably not more than 10% by weight. The weight-average size of the acrylic rubber-like polymer particles (f1) having a size of less than 350 nm is preferably 60 to 200 nm, more preferably 80 to 180 nm, and the weight-average size of the acrylic rubber-like polymer particles (f2) having a size of not less than 350 nm is preferably 400 to 2,000 nm, more preferably 500 to 1,500 nm. The weight-average size of the whole acrylic rubber-like polymer particles is preferably 150 to 700 nm, more preferably 200 to 650 nm. When the sizes of the acrylic rubber-like polymer particles fall within the above-defined ranges, there can be obtained a rubber-reinforced thermoplastic resin further improved in the specified performance.

The copolymer resin (A3) may be at least one of the copolymer resins obtained by polymerizing vinyl monomers in the presence of an acrylic rubber-like polymer, or a combination of two or more of the said copolymer resins properly mixed to satisfy the requirements of the copolymer resin (A3).

The acrylic rubber-like polymer (f) contained in the copolymer resin (A3) may be the one to which no vinyl monomer is grafted, but it is preferably the one to which vinyl monomer(s) have been grafted. When grafted, the graft ratio is preferably not less than 5% by weight, more preferably 10 to 200% by weight, even more preferably 10 to 150% by weight. When the graft ratio is held within the above range, the molded article has a high-level balance of surface appearance and impact resistance.

The intrinsic viscosity [η] (measured in methylethylketone at 30° C.) of the acetonitrile-soluble resin moiety in the rubber-reinforced thermoplastic resins in the first and second aspects of the present invention is preferably 0.1 to 1 dl/g, more preferably 0.15 to 0.9 dl/g. When the intrinsic viscosity is within the above-defined range, there can be obtained a rubber-reinforced thermoplastic resin capable of forming the molded articles having excellent impact resistance and surface appearance.

Described below is the rubber-reinforced thermoplastic resin composition in the third aspect of the present invention. The rubber-reinforced thermoplastic resin composition in the third aspect of the present invention comprises the rubber-reinforced thermoplastic resin (I) used in the first or second aspect of the present invention and a non-diene rubber-like polymer-reinforced thermoplastic resin (II) excluding the rubber-reinforced thermoplastic resins (I) in the first and second aspects of the present invention, and the molded articles obtained by using this resin composition have a high-level balance of weather resistance, impact resistance and surface appearance.

The component (II) can be obtained by polymerizing a vinyl monomer in the presence of a non-diene rubber-like polymer. The graft ratio is preferably not less than 5% by weight, more preferably 10 to 200% by weight, even more preferably 10 to 150% by weight. When the graft ratio is in this range, weather resistance, impact resistance and surface appearance of the molded article are well-balanced improved.

The component (II) may be a mixture of a copolymer resin obtained by polymerizing a vinyl monomer in the presence of a non-diene rubber-like polymer and a (co)polymer of a vinyl monomer such as exemplified in the explanation of the rubber-reinforced thermoplastic resin in the first aspect of the present invention.

The term "non-diene rubber-like polymer" is used here to refer to rubber which has substantially no double bond in the backbone. The expression "has substantially no double bond in the backbone" means that either the polymer has no double bond, or even if it has double bonds in the backbone, such double bonds are provided merely to such an extent that no effect is given to weather resistance. The upper limit of the amount of double bonds allowed to exist is variable depending on the type of the rubber-like polymer used, but it can be decided by conducting appropriate experiment for each type of the rubber-like polymer used.

Examples of the non-diene rubber-like polymers usable as component (II) include ethylene-α-olefinic rubbers such as ethylene-α-olefin random copolymer rubber and ethylene-α-olefin-nonconjugated diene compound random copolymer rubber; hydrogenated diene rubbers such as natural rubber, polybutadiene rubber, polyisoprene rubber, polychloroprene rubber, styrene-butadiene random copolymer rubber (styrene content: preferably 5 to 60% by weight), styrene-isoprene random copolymer rubber, acrylonitrile-butadiene random copolymer rubber, isobutylene-isoprene random copolymer rubber (butyl rubber), styrene-butadiene block copolymer rubber, styrene-isoprene block copolymer rubber, and styrene-isoprene-styrene block copolymer rubber; and silicone rubber.

The said ethylene-α-olefinic rubbers include copolymer rubber obtained by copolymerizing a monomer comprising a 5-95/95-5/0-30 (total being 100% by weight) mixture of ethylene, a $C_3$–$C_{20}$ α-olefin and nonconjugated diene.

Examples of the $C_3$–$C_{20}$ α-olefins usable here are propylene, 1-butene, 1-pentene, 1-hexene, 4-methyl-1-pentene, 1-heptene, 1-octene, 1-decene and 1-dodecene. Of these olefins, propylene, 1-butene and 1-octene are preferred. Propylene and 1-butene are especially preferred. These α-olefins may be used either singly or as a combination of two or more. The carbon number of these α-olefins is 3 to 20, preferably 3 to 12, more preferably 3 to 8. Too much carbon number (more than 20) may lead to badly deteriorated copolymerizability. The ethylene: α-olefin ratio is preferably 5 to 95:95 to 5, more preferably 50 to 90:50 to 10, especially preferably 40 to 85:60 to 15.

Examples of the nonconjugated diene compounds that can be used in combination with ethylene and α-olefin include alkenyl norbornenes, cyclic dienes and aliphatic dienes, in which dicyclopentadiene and 5-ethylidene-2-norbornene are preferred. These nonconjugated diene compounds may be used either singly or as a combination of two or more. The content of the nonconjugated diene monomer unit in the ethylene-α-olefinic rubber is preferably 0 to 30% by weight, more preferably 0 to 15% by weight, based on the whole rubber. The degree of unsaturation of this copolymer rubber is preferably confined to the range of 0 to 40 in terms of iodine value. Too high degree of unsaturation tends to cause deterioration of weather resistance, light resistance and hue of the composition.

For obtaining the said ethylene-α-olefinic rubber, there may be used either a homogeneous or a heterogeneous catalyst. Metallocene catalysts can be cited as a typical example of homogeneous catalysts. Vanadium catalysts comprising a combination of a vanadium compound and an organic aluminum compound are an example of heterogeneous catalysts.

Mooney viscosity ($ML_{1+4}$, 100° C.) of the said ethylene-α-olefinic rubber is preferably not more than 60, more preferably not more than 50, especially 20 to 40, and its glass transition temperature is preferably −110 to −40° C., more preferably −70 to −45° C.

The said hydrogenated rubber is usually a hydride of a conjugated diene rubber-like polymer. Examples of such hydrides are the hydrogenated products of conjugated diene polymers and the hydrogenated products of copolymers of conjugated dienes and aromatic vinyl compounds. The latter includes random and block copolymers of conjugated diene compounds and aromatic vinyl compounds.

The block structures of the hydrogenated products of block copolymers include the hydrogenated structures of various blocks such as aromatic vinyl compound polymer block, aromatic vinyl compound/conjugated diene random copolymer block, block in which the 1,2-vinyl content in polybutadiene is not more than 20% by weight in case where the conjugated diene compound is butadiene, polybutadiene block in which the 1,2-vinyl content exceeds 20% by weight, and taper block in which the respective components increase gradually in the case of copolymers of polybutadiene and aromatic vinyl compounds.

The types of block copolymer include AB type, ABA type, $(AB)_n$ type, $(AB)_nA$ taper type, and radial tereblock type.

The hydrogenation rate of the conjugated diene moiety in the block copolymer is preferably not less than 95 mol %, more preferably not less than 97 mol %. When the hydrogenation rate is too low (below 95 mol %), there may not be obtained a rubber-modified thermoplastic resin composition with desired weather resistance and color fastness.

As the conjugated diene monomer for producing the block copolymer, there can be used 1,3-butadiene, isoprene, 1,3-pentadiene and chloroprene. Of these, 1,3-butadiene, isoprene are preferred because they can be used industrially and a hydrogenated diene-based rubber-like polymer having excellent properties can be obtained.

As the aromatic vinyl compound, for producing the block copolymer, there can be exemplified styrene, α-methylstyrene, methylstyrene, vinylxylene, monochlorostyrene, dichlorostyrene, monobromostyrene, dibromostyrene, fluorostyrene, p-tert-butylstyrene, ethylstyrene and vinylnaphthalene. Of these, styrene or monomers containing styrene in an amount of not less than 50% by weight. These compounds may be used alone or as a mixture of two or more.

The ratio of aromatic vinyl compound to conjugated diene compound in this block copolymer can be changed according to the required performance of the final product resin, and the ratio of aromatic vinyl compound in the copolymer is preferably 10 to 50% by weight, more preferably 13 to 40% by weight.

As the said silicone rubber, a polyorganosiloxane rubber-like polymer is preferably used.

The organosiloxane used for the said polymer is, for instance, one which has a structural unit represented by the following formula (1) and also has a linear, branched or preferably cyclic molecular structure.

$$R_mSiO_{(4-m)/2} \tag{1}$$

wherein R is a substituted or unsubstituted monovalent hydrocarbon group, and m is an integer of 0 to 3.

Examples of the substituted or unsubstituted monovalent hydrocarbon group constituting the said organosiloxane are methyl, ethyl, propyl, phenyl, and these groups substituted with a cyano group, etc.

Examples of the said organosiloxane include cyclic organosiloxanes such as hexamethylcyclotrisiloxane, octamethylcyclotetrasiloxane, decamethylcyclopentasiloxane, dodecamethylcyclohexasiloxane and trimethyltriphenylcyclotrisiloxane, as well as linear and branched organosiloxanes. These organosiloxanes may be used alone or as a combination of two or more.

It is also possible to use a graft crossing agent or a crosslinking agent together with the said organosiloxane within limits not impairing the objective properties of the products of the present invention.

As the graft crossing agent, p-vinylphenylmethyldimethoxysilane, 2-(p-vinylphenyl)ethylmethyldimethoxysilane, 3-(p-vinylbenzoyloxy)propylmethyldimethoxysilane and the like can be used.

The amount of the graft crossing agent used is preferably 0.2 to 20% by weight when the total of the organosiloxane and the crossing agent is supposed to be 100% by weight.

The weight-average molecular weight of the said polyorganosiloxane rubber-like polymer, as measured by GPC (gel permeation chromatography) with polystyrene calibration, is 30,000 to 1,000,000, preferably 50,000 to 300,000.

It is possible to increase the molecular weight of the polymer by adding a small quantity of a crosslinking agent in the course of preparation of the polyorganosiloxane rubber-like polymer.

The molecular weight distribution of the said non-diene rubber-like polymer, namely the weight-average molecular weight/number-average molecular weight ($M_w/M_n$) ratio is preferably 1.1 to 3, more preferably 1.15 to 2.5. When the $M_w/M_n$ ratio exceeds 3, visual appearance of the molded article obtained from the produced resin composition may deteriorate due to formation of flow marks on the article surface and/or other trouble.

Here, the vinyl monomer polymerized in the presence of a non-diene rubber-like polymer is explained. The vinyl monomers usable here are the same as those cited in the explanation of the rubber-reinforced thermoplastic resin in the first aspect of the present invention.

Among those cited before, (meth)acrylic acid alkyl esters, aromatic vinyl monomers, vinyl cyanide monomers and maleimide monomers are preferably used in the instant aspect. These monomers may be used either singly or as a combination of two or more, the latter case being preferred. Use of an aromatic vinyl monomer such as styrene conduces to the improvement of workability of the resin composition, while use of a vinyl cyanide monomer makes it possible to obtain a molded article improved in chemical resistance, impact resistance and compatibility with the polymers having polarity. Use of a maleimide monomer contributes to the improvement of resistance to heat distortion. Even if no maleimide monomer is used, it is possible to introduce the maleimide monomer unit by conducting after-imidation.

In case where two or more different vinyl monomers (b1) are used in combination, their amounts blended are adjusted such that preferably the aromatic vinyl monomer (b1-1) is 5 to 60% by weight, the (meth)acrylic alkyl ester monomer in which the carbon number of the alkyl group is 1 to 12 (b1-2) is 0 to 55% by weight, the maleimide monomer (b1-3) is 0 to 65% by weight, the vinyl cyanide monomer (b1-4) is 0 to 40% by weight, and the other copolymerizable vinyl monomer (b1-5) is 0 to 45% by weight, more preferably (b1-1) is 15 to 50% by weight, (b1-2) is 0 to 45% by weight, (b1-3) is 0 to 60% by weight, (b1-4) is 0 to 35% by weight, and (b1-5) is 0 to 25% by weight. In case, for instance, where imidation is effected by copolymerizing maleic anhydride, it is merely required that the content of the maleimide monomer unit after imidation be confined in the above-defined range.

In case where two or more of the said vinyl monomers are used in combination, the lower limit of the blended amount of each monomer is preferably not less than 5% by weight, more preferably not less than 10% by weight when the combined amount of the monomers blended is given as 100% by weight. If the amount of these monomers blended is too small (less than 5% by weight), the respective monomers may be unable to exhibit their normal performance.

The said non-diene rubber-like polymer-reinforced thermoplastic resin (II) can be produced by polymerizing a vinyl monomer in the presence of a non-diene rubber-like polymer by a known method, preferably emulsion polymerization, emulsion-suspension polymerization, solution polymerization, bulk polymerization, bulk-suspension polymerization, emulsion-bulk polymerization, emulsion-solution polymerization or micro-suspension polymerization. If necessary, there may be used a polymerization initiator, emulsifier, molecular weight modifier, electrolyte and/or other additives.

The said resin (II) may be a resin obtained in the manner described above or a mixture of such a resin and a (co)polymer obtained by separately polymerizing a vinyl monomer. As the vinyl monomer used for forming the (co)polymer, it is possible to favorably use one polymerized in the presence of a non-diene rubber-like polymer. The preferred amount of this vinyl monomer used is also the same as mentioned above. The content of the said non-diene rubber-like polymer in the component (II) is preferably 2 to 70% by weight, more preferably 5 to 65% by weight, based on the whole resin (II).

As for the ratios of the rubber-reinforced thermoplastic resin (I) and the non-diene rubber-like polymer-reinforced thermoplastic resin (II) in the composition of the present invention, (I) is preferably 1 to 99% by weight, more preferably 5 to 95% by weight, and (II) is preferably 99 to 1% by weight, more preferably 95 to 5% by weight, with (I)+(II)=100% by weight. When the ratios of (I) and (II) are in the above-defined ranges, it is possible to obtain the objective composition which can provide the molded articles having further improved properties.

The content of the acrylic rubber-like polymer constituting the component (I) in the composition of the present invention is 1 to 40% by weight, preferably 2 to 35% by weight, and the content of the non-diene rubber-like polymer constituting the component (II) is 1 to 40% by weight, preferably 2 to 35% by weight.

When the contents of the said polymers fall within the above-defined ranges, a composition having the qualities envisaged in the present invention can be obtained.

In the rubber-reinforced thermoplastic resin and the composition containing it according to the present invention, other thermoplastic resin(s) may be incorporated within limits not prejudicial to the required performance of the product to provide the molding materials for wider scope of use.

As such additive thermoplastic resin, there can be used, for instance, styrene type resins such as impact-resistant polystyrene, ABS resin (acrylonitrile-butadiene-styrene copolymer), heat-resistant ABS resin (acrylonitrile-butadiene-styrene-α-methylstyrene copolymer), super-heat-resistant ABS resin (acrylonitrile-butadiene-styrene-phenylmaleimide copolymer) and MABS resin (methyl methacrylate-acrylonitrile-butadiene-styrene copolymer); polyvinyl chloride, polyamides, polycarbonates, polybutylene terephthalate, polyethylene terephthalate, polyphenylene oxide and the like, either singly or as a combination of two or more.

The amount of the said additive thermoplastic resin to be contained is variable depending on the purpose of use of the composition, but usually it is preferably 1 to 300 parts by weight, more preferably 5 to 100 parts by weight, based on 100 parts by weight of the composition. If its content is below the above-defined range, the desired effect of the use of this resin may not be produced.

In the rubber-reinforced thermoplastic resin and the rubber-reinforced thermoplastic resin composition of the present invention, it is also possible to add various resin additives such as inorganic filler, metal powder, reinforcing agent, plasticizer, compatibilizing agent, heat stabilizer, light stabilizer, antioxidant, ultraviolet absorber, dye, pigment, antistatic agent, lubricant, flame retardant, etc.

Mixing of other thermoplastic resin(s) or resin additives in the resin and the composition of the present invention can be effected by using suitable means such as single-screw extruder, double-screw extruder, Banbury mixer, pressure kneader, two-roll mill, etc. In performing mixing, the respective components may be mixed all at one time or may be added in multiple stages.

The rubber-reinforced thermoplastic resin and the composition containing it according to the present invention can be worked into the molded articles of the desired configurations by the various known molding methods such as injection molding, sheet extrusion molding, vacuum molding, contour extrusion molding, compression molding, hollow molding, differential pressure molding, blow molding, foam molding, gas injection molding, etc., and such molded articles can be offered to practical use as various parts, chassis, housings, etc., for the products which are required to have high impact and weather resistance as well as good surface appearance, such as OA equipment, household electrical appliances, electric and electronic devices, miscellaneous goods, sanitary products, vehicles, etc.

The molded articles obtained by using the rubber-reinforced thermoplastic resin of the present invention can be provided with a Charpy impact strength (as measured by the method described in the Examples given below) of preferably not less than 1.5 kJ/m$^2$, more preferably not less than 2 kJ/m$^2$, and a surface gloss of preferably not less than 88%, more preferably not less than 92%.

With the rubber-reinforced thermoplastic resin of the present invention, it is possible to obtain the molded articles having excellent impact resistance, weather resistance and surface appearance, and the composition containing the said rubber-reinforced thermoplastic resin and a non-diene rubber-like polymer-reinforced thermoplastic resin according to the present invention makes it possible to obtain the molded articles having a high-level balance of impact resistance, weather resistance and surface appearance.

EXAMPLES

The present invention will be further illustrated by showing the examples as well as the comparative examples, but it is to be understood that these examples are merely intended to be illustrative and not to be construed as limiting the scope of the invention. In the following Examples and Comparative Examples, all "parts" and "percents (%)" are by weight unless otherwise noted.

1. Evaluation Methods

The various evaluation methods used in the Examples and the Comparative Examples are as described below.

(1) Particle Size Distribution of Acrylic Rubber-Like Polymer Particles:

The size of the acrylic rubber-like polymer particles in the acrylic rubber-like polymer latex was measured by Microtrack UPFA150 of Honeywell Co., Ltd. at room temperature. Unit: nm; ratio: %.

(2) Graft Ratio:

The fixed amounts (x) of a rubber-reinforced thermoplastic resin and a non-diene rubber-like polymer-reinforced thermoplastic resin were supplied into acetonitrile, the mixture was shaken by a shaker for one hour to have the free (co)polymer dissolved in the solution, and this solution was centrifuged at 22,000 rpm for one hour and dried by a vacuum dryer at 120° C. for 2 hours to obtain a insoluble matter (y). Graft ratio was calculated from the following equation.

Graft ratio (%)={(y−amount of rubber in x)÷amount of rubber in x}×100

(3) Particle Size Distribution of Acrylic Rubber-Like Polymer Particles (f) in Rubber-Reinforced Thermoplastic Resin:

A molded article was obtained by injection-molding the rubber-reinforced thermoplastic resin, sliced into the pieces of 80 to 120 nm thickness by a mictrotome, stained with osmium tetraoxide and examined under a transmission electron microscope to observe the particle distribution. The above-mentioned 80 to 120 nm thickness represents the area where the sliced pieces assume a silver to gold color as observed under the transmission electron microscope. The microphotographs were subjected to image analyses to measure the particles with the sizes less than 350 nm and those with the sizes not less than 350 nm, from which the proportions (%) of the particles less than 350 nm and the particles not less than 350 nm were determined.

(4) Charpy Impact Strength:

Measured according to ISO 179. Unit: kJ/m$^2$ (5) Gloss:

The 800×400×3 mm thick plate-like molded articles were obtained by injection-molding the rubber-reinforced thermoplastic resin and the rubber-reinforced thermoplastic resin composition of the present invention, and their surface gloss was measured at an incident angle of 60° C. by a digital varied-angle glossimeter mfd. by Suga Testing Machines Co., Ltd. Unit: %.

(6) Surface Appearance (Flow Marks, Segregation, Jet-Blackness Blackness) and Gloss:

The test pieces colored in black with a pigment (carbon black) were injection molded, and the appearance of the surface of each of these test pieces was visually observed. The evaluation results were indicated as follows.

A: No flow marks were formed and little segregation took place. Also, the test piece had good jet-blackness and gloss.

B: Flow marks were slightly admitted and there took place slight segregation. Also, the test piece slightly lacked jet-blackness and gloss.

C: Flow marks and segregation were admitted to a certain degree. Also, the test piece rather lacked jet-blackness and gloss.

2. Preparation of Acrylic Rubber-Like Polymer Latex (1) Preparation Example G-1

99 parts of n-butyl acrylate (hereinafter abbreviated as BA) and 1 part of allyl methacrylate (hereinafter abbreviated as AMA) were mixed to prepare a monomeric mixture (I). 150 parts of water, 1 part of disproportionated potassium rosinate used as emulsifier, 1.5 part of sodium salt of a β-naphthalene-formalin sulfonate condensate and 1 part of sodium hydrogencarbonate were supplied to a 5-liter glass-made reactor equipped with a stirrer, a material and adjunct adding device, a thermometer and a heating device, and the mixture was heated to an internal temperature of 60° C. with stirring in a stream of nitrogen. At the point when the internal temperature reached 60° C., 10.1 parts of the monomeric mixture (I) was supplied to the reactor and the mixture was further heated to 75° C. On reaching 75° C., a solution of 0.025 part of potassium persulfate (hereinafter abbreviated as KPS) in 2.0 parts of water was supplied to the reactor to start polymerization at the same temperature. One hour after start of the polymerization, a solution prepared by dissolving 0.5 part of higher fatty acid sodium soap in 12 parts of water with heating at 60° C. and a solution of 0.15 part of KPS in 80 parts of water were supplied to the reactor. Immediately thereafter, 89.9 parts of the monomeric mixture (I) was added continuously over a period of 2 hours. On conclusion of the continuous addition of the monomeric mixture (I), a solution of 0.06 part of KPS in 5.0 parts of water was supplied to the reactor, and the internal temperature of the reactor was raised from 75° C. to 80° C. After reaching 80° C., the internal temperature of the reactor was maintained at this temperature for 1.5 hour, at which the polymerization reaction was completed to give an acrylic rubber-like polymer latex (G-1). The polymerization conversion after the reaction was 97%. The weight-average particle size of the obtained acrylic rubber-like polymer was 284 nm. In these acrylic rubber-like polymer particles, those of less than 350 nm had a weight-average size of 127 nm and accounted for 77% of the whole particles, and those of not less than 350 nm had a weight-average size of 806 nm and accounted for 23% of the whole particles. The content of the acrylic rubber-like polymer particles of 300 to 400 nm was 5%.

(2) Preparation Examples G-2 to G-9

Acrylic rubber-like polymer latices (G2 to G9) were obtained in the same way as G-1 from the formulations shown in Table 1.

The results of determination of polymerization conversion, and the sizes and proportions (%) of the acrylic rubber-like polymer particles are shown in Table 1.

TABLE 1

|  | G-1 | G-2 | G-3 | G-4 | G-5 |
|---|---|---|---|---|---|
| Polymerization formulation (parts) of acrylic rubber-like polymer | | | | | |
| BA (initial stage) | 10 | 10 | 20 | 20 | 0 |
| BA (latter stage) | 89 | 89 | 79 | 79 | 99 |
| AMA (initial stage) | 0.1 | 0.1 | 0.2 | 0.2 | 0 |
| AMA (latter stage) | 0.9 | 0.9 | 0.8 | 0.8 | 1.0 |
| Higher fatty acid sodium soap | 0.5 | 0.25 | 1.25 | 1.25 | 2.3 |
| Disproportionated potassium rosinate | 1.0 | 1.25 | 0.25 | 1.25 | 0.2 |
| Sodium salt of β-naphthalene-formalin sulfonate condensate | 1.5 | 1.0 | 1.0 | 1.0 | 1.0 |
| KPS | 0.235 | 0.205 | 0.235 | 0.235 | 0.18 |
| Water | 150 | 150 | 150 | 140 | 150 |
| Polymerization conversion (%) | 98 | 93 | 95 | 93 | 97 |
| Particle size and particle size distribution | | | | | |
| Weight-average size (nm) of the whole particles | 284 | 318 | 427 | 356 | 104 |
| Weight-average size (nm) of the particles not more than 350 nm | 127 | 83 | 152 | 80 | 104 |
| Proportion (%) of the particles not more than 350 nm | 77 | 54 | 72 | 45 | 100 |
| Weight-average size (nm) of the particles not less than 350 nm | 806 | 590 | 1180 | 610 | — |
| Proportion (%) of the particles not less than 350 nm | 23 | 46 | 27 | 55 | 0 |

|  | G-6 | G-7 | G-8 | G-9 |
|---|---|---|---|---|
| Polymerization formulation (parts) of acrylic rubber-like polymer | | | | |
| BA (initial stage) | 10 | 10 | 10 | 10 |
| BA (latter stage) | 89 | 89 | 89 | 89 |
| AMA (initial stage) | 0.1 | 0.1 | 0.1 | 0.1 |
| AMA (latter stage) | 0.9 | 0.9 | 0.9 | 0.9 |
| Higher fatty acid sodium soap | 1.25 | 0.5 | 0.5 | 1.25 |
| Disproportionated potassium rosinate | 0.25 | 1.0 | 1.0 | 0.25 |
| Sodium salt of β-naphthalene-formalin sulfonate condensate | 1.0 | 1.0 | 1.0 | 1.0 |
| KPS | 0.235 | 0.235 | 0.235 | 0.235 |
| Water | 125 | 150 | 125 | 150 |
| Polymerization conversion (%) | 96 | 98 | 96 | 93 |
| Particle size and particle size distribution | | | | |
| Weight-average size (nm) of the whole particles | 694 | 257 | 286 | 752 |
| Weight-average size (nm) of the particles not more than 350 nm | 162 | 108 | 215 | 149 |
| Proportion (%) of the particles not more than 350 nm | 81 | 71 | 94 | 75 |
| Weight-average size (nm) of the particles not less than 350 nm | 2960 | 598 | 1900 | 2511 |

TABLE 1-continued

| Proportion (%) of the particles not less than 350 nm | 19 | 29 | 6 | 25 |
| --- | --- | --- | --- | --- |

3. Preparation of Copolymer Resins

(1) Preparation Example H-1

73 parts of styrene (hereinafter abbreviated as St) and 23 parts of acrylonitrile (hereinafter abbreviated as AN) were mixed to prepare a monomeric mixture (II). 100 parts of the said acrylic rubber-like polymer latex (calculated as solid) and 110 parts of water were supplied to the glass-made reactor used in Preparation Example G-1, and the mixture was heated to 40° C. with stirring in a stream of nitrogen. At the point when the temperature reached 40° C., the 86% portion of a solution of 0.3 part of dextrose, 1.2 part of sodium pyrophosphate and 0.01 part of ferrous sulfate in 20 parts of water (this solution being hereinafter referred to as RED solution) and the 30% portion of a solution of 0.4 part of t-butyl hydroperoxide (hereinafter abbreviated as BHP) and 2.4 parts of disproportionated potassium rosinate in 30 parts of water (this solution being hereinafter referred to as CAT solution) were supplied, and immediately thereafter, the monomeric mixture (II) and the CAT solution were added continuously over a period of 3 hours and 3.5 hours, respectively, to start the polymerization. The temperature was raised to 75° C. after start of the polymerization and maintained as such throughout the reaction. 180 minutes after start of the polymerization, the remaining 14% portion of the RED solution was supplied to the reactor, and the mixture was maintained at the same temperature for 60 minutes to complete the polymerization. The produced copolymer latex was coagulated, washed with water and dried to obtain a powdery copolymer resin H-1.

(2) Preparation Examples H-2 to H-9

The copolymer latices were obtained in the same way as H-1 from the formulations shown in Table 2. These graft copolymer latices were coagulated, washed with water and dried to obtain the powdery copolymer resins H-2 to H-9.

The results of determination of polymerization conversion and graft ratio are shown in Table 2.

TABLE 2

|  | H-1 | H-2 | H-3 | H-4 | H-5 |
| --- | --- | --- | --- | --- | --- |
| Polymerization formulations of copolymer resins |  |  |  |  |  |
| Acrylic rubber-like polymers |  |  |  |  |  |
| G-1 | 50 | — | — | — | — |
| G-2 | — | 50 | — | — | — |
| G-3 | — | — | 50 | — | — |
| G-4 | — | — | — | 50 | — |
| G-5 | — | — | — | — | 50 |
| G-6 | — | — | — | — | — |
| G-7 | — | — | — | — | — |
| G-8 | — | — | — | — | — |
| G-9 | — | — | — | — | — |
| Monomers |  |  |  |  |  |
| St | 36.5 | 36.5 | 36.5 | 36.5 | 36.5 |
| AN | 13.5 | 13.5 | 13.5 | 13.5 | 13.5 |
| Molecular weight modifier | 0 | 0 | 0 | 0 | 0 |
| Polymerization conversion (%) | 98 | 96 | 97 | 100 | 100 |
| Graft ratio (%) | 79 | 84 | 91 | 76 | 78 |

|  | H-6 | H-7 | H-8 | H-9 |
| --- | --- | --- | --- | --- |
| Polymerization formulations of copolymer resins |  |  |  |  |
| Acrylic rubber-like polymers |  |  |  |  |
| G-1 | — | — | — | — |
| G-2 | — | — | — | — |
| G-3 | — | — | — | — |
| G-4 | — | — | — | — |
| G-5 | — | — | — | — |
| G-6 | 50 | — | — | — |
| G-7 | — | 50 | — | — |
| G-8 | — | — | 50 | — |
| G-9 | — | — | — | 50 |
| Monomers |  |  |  |  |
| St | 36.5 | 36.5 | 36.5 | 36.5 |
| AN | 13.5 | 13.5 | 13.5 | 13.5 |
| Molecular weight modifier | 0 | 0.3 | 0.3 | 0 |
| Polymerization conversion (%) | 100 | 98 | 98 | 100 |
| Graft ratio (%) | 84 | 68 | 49 | 77 |

4. Preparation of Various Thermoplastic Resins

(1) Preparation Example H-10

(Preparation of Ethylene-Propylene Rubber-Like Polymer-Reinforced Thermoplastic Resin)

20 parts of an ethylene-propylene rubber-like polymer (EP84, trade name, produced by JSR), 56 parts of St, 24 parts of AN and 110 parts of toluene were supplied to a 20-liter stainless steel autoclave equipped with a ribbon stirrer, a continuous adjutant adding device and a thermometer. The internal temperature was raised to 75° C. and the contents of the autoclave were stirred for one hour to form a homogeneous solution. Then 0.45 part of t-butyl peroxyisopropionate was added and the internal temperature was further raised. On reaching 100° C., the mixture was stirred at 100 rpm while maintaining this temperature to carry out a polymerization reaction. After the passage of 4 hours from the start of the polymerization reaction, the internal temperature was raised to 120° C. and the reaction was further continued at this temperature for 2 hours and concluded. The graft ratio was 55%. After lowering the internal temperature to 100° C., 0.2 part of octadecyl-3-(3,5-di-t-butyl-4-hydroxyphenol)-propionate was added, and the reaction mixture was drawn out from the autoclave, subjected to steam distillation to remove the unreacted materials and solvent, then extruded by a 40 mmφ vented extruder at a cylinder temperature of 220° C. under a vacuum of 700 mmHg to substantially eliminate the volatiles, and pelletized. This product is called ethylene-propylene rubber-like polymer-reinforced thermoplastic resin H-10.

(2) Preparation Example H-11

Preparation of Hydrogenated Rubber-Reinforced Thermoplastic Resin

To a 10-liter stainless steel autoclave equipped with a ribbon stirrer, 30 parts of a hydrogenated block copolymer (Dynalon 4600P, trade name, produced by JSR), 50 parts of methyl methacrylate, 10 parts of St, 10 parts of AN and 120 parts of toluene were supplied and dissolved by stirring to form a homogeneous solution. To this solution, 0.5 part of t-butyl peroxyisopropiocarbonate and 0.1 part of t-dodecylmercaptan were added and the mixture was heated with stirring. After reaching 100° C., the temperature was controlled to stay constant and the mixture was subjected to polymerization reaction with stirring at 200 rpm. The reaction was continued for 6 hours and completed. The polymerization conversion was 85% and the graft ratio was 42%.

After cooling to 100° C., 0.2 part of 2,2-methylenebis-4-methyl-6-butylphenol was added and the reaction mixture was withdrawn from the autoclave, then subjected to steam distillation to remove the unreacted materials and solvent, pulverized and extruded by a 40 mm$\phi$ vacuum vented extruder (220° C., 700 mmHg) to substantially eliminate the volatiles to obtain the pellets. This product is called hydrogenated rubber-reinforced thermoplastic resin H-11.

5. Examples 1–9 and Comparative Examples 1–2

An acrylonitrile-styrene copolymer (hereinafter referred to as AS resin), an acrylonitrile-styrene-N-phenylmaleimide copolymer [polymerization ratio: 50/10/40 (%)] (hereinafter referred to as maleimide resin), a heat stabilizer and a black pigment (carbon black) were mixed with the said powdery copolymer resins (H-1 to H-9) with the formulations shown in Table 3, and each mixture was kneaded by a single-screw extruder and pelletized. The test pieces for evaluation of properties and those for evaluation of appearance were made from the obtained resin pellets by an injection molder, and evaluated by the above-described methods. The results are shown in Table 3.

Then, the rubber-reinforced thermoplastic resin composition containing the said rubber-reinforced thermoplastic resin H-1 and the non-diene rubber-like polymer-reinforced thermoplastic resin H-10 or H-11 was evaluated in the same way as in Example 1. The results are shown in Table 3.

TABLE 3

| | Example | | | | | |
|---|---|---|---|---|---|---|
| | 1 | 2 | 3 | 4 | 5 | 6 |
| Formulations of rubber-reinforced thermoplastic resin compositions (parts) | | | | | | |
| Copolymer resins | | | | | | |
| H-1 | 24 | — | — | — | — | — |
| H-2 | — | 24 | — | — | — | — |
| H-3 | — | — | 24 | — | — | — |
| H-4 | — | — | — | — | — | — |
| H-5 | — | — | — | — | — | — |
| H-6 | — | — | — | 24 | — | — |
| H-7 | — | — | — | — | 24 | — |
| H-8 | — | — | — | — | — | 24 |
| H-9 | — | — | — | — | — | — |
| H-10 | — | — | — | — | — | — |
| H-11 | — | — | — | — | — | — |
| Copolymers | | | | | | |
| AS resin | 51 | 51 | 51 | 51 | 51 | 51 |
| Maleimide resin | 25 | 25 | 25 | 25 | 25 | 25 |
| Heat stabilizer | 0.1 | 0.1 | 0.1 | 0.1 | 0.1 | 0.1 |
| Black pigment | 1.06 | 1.06 | 1.06 | 1.06 | 1.06 | 1.06 |
| Rubber-reinforced thermoplastic resins | | | | | | |
| Proportion (%) of particles not more than 350 nm | 80 | 60 | 77 | 95 | 73 | 97 |
| Proportion (%) of particles not less than 350 nm | 20 | 40 | 23 | 5 | 27 | 3 |
| Evaluation of molded articles | | | | | | |
| Charpy impact strength | 5 | 5.4 | 5.3 | 2.2 | 2.5 | 2.5 |
| Gloss | 95 | 95 | 96 | 92 | 95 | 93 |
| Surface appearance | | | | | | |
| Flow marks | A | A | A | A | A | A |
| Segregation | A | A | A | B | A | B |
| Jet blackness | A | A | A | B | A | B |
| Gloss | A | A | A | B | A | B |

| | Example | | | Comp. Example | |
|---|---|---|---|---|---|
| | 7 | 8 | 9 | 1 | 2 |
| Formulations of rubber-reinforced thermoplastic resin compositions (parts) | | | | | |
| Copolymer resins | | | | | |
| H-1 | — | 17 | 17 | — | — |
| H-2 | — | — | — | — | — |
| H-3 | — | — | — | — | — |
| H-4 | — | — | — | 24 | — |
| H-5 | — | — | — | — | 24 |
| H-6 | — | — | — | — | — |
| H-7 | — | — | — | — | — |
| H-8 | — | — | — | — | — |
| H-9 | 24 | — | — | — | — |
| H-10 | — | 18 | — | — | — |
| H-11 | — | — | 12 | — | — |
| Copolymers | | | | | |
| AS resin | 51 | 65 | 71 | 51 | 51 |
| Maleimide resin | 25 | — | — | 25 | 25 |
| Heat stabilizer | 0.1 | 0.1 | 0.1 | 0.1 | 0.1 |
| Black pigment | 1.06 | 1.06 | 1.06 | 1.06 | 1.06 |
| Rubber-reinforced thermoplastic resins | | | | | |
| Proportion (%) of particles not more than 350 nm | 86 | 80 | 80 | 48 | 100 |
| Proportion (%) of particles not less than 350 nm | 14 | 20 | 20 | 52 | 0 |
| Evaluation of molded articles | | | | | |
| Charpy impact strength | 2.9 | 20.3 | 16.2 | 5 | 1 |
| Gloss | 89 | 95 | 96 | 93 | 96 |
| Surface appearance | | | | | |
| Flow marks | A | A | A | A | A |
| Segregation | B | A | A | A | C |
| Jet blackness | B | A | A | A | A |
| Gloss | B | A | A | C | A |

As seen from Table 3, in Comparative Example 1 in which the proportion of the acrylic rubber-like polymer particles not less than 350 nm in size exceeds the range defined in the present invention (i.e., the proportion of the acrylic rubber-like polymer particles less than 350 nm in size is below the range specified in the present invention), surface appearance of the molded articles was poor.

In Comparative Example 2 in which the proportion of the acrylic rubber-like polymer particles not less than 350 nm in size is below the range defined in the present invention (i.e., the proportion of the acrylic rubber-like polymer particles less than 350 nm in size exceeds the range specified in the present invention), impact resistance is low.

In contrast, in any of Examples 1 to 7 of the present invention, the results showed excellent impact resistance, gloss and surface appearance of the molded articles.

In Examples 8 and 9 in which a non-diene rubber-like polymer-reinforced thermoplastic resin was used instead of a maleimide resin, there was obtained an especially higher level of balance of weather resistance, impact resistance and surface appearance.

What is claimed is:

1. A rubber-reinforced thermoplastic resin comprising a copolymer resin (A1) obtained by polymerizing a vinyl monomer (b1) in the presence of an acrylic rubber-like polymer (a), or a mixture of said copolymer resin (A1) and a (co)polymer (A2) of a vinyl monomer (b2), said acrylic rubber-like polymer (a) comprising 55 to 98% by weight of acrylic rubber-like polymer particles (a1) which have a particle size of less than 350 nm and 2 to 45% by weight of acrylic rubber-like polymer particles (a2) which have a particle size of not less than 350 nm, wherein the content of said acrylic rubber-like polymer (a) is 5 to 80% by weight based on said rubber-reinforced thermoplastic resin; and the graft ratio of said copolymer resin (A1) is 68 to 200%.

2. A rubber-reinforced thermoplastic resin according to claim 1, wherein a maleimide monomer is contained in said vinyl monomer (b2) in an amount of 5 to 65% by weight based on the overall amount of said vinyl monomer (b2).

3. A rubber-reinforced thermoplastic resin according to claim 1, wherein the weight-average size of said acrylic rubber-like polymer particles (a1) is 60 to 200 nm, and the weight-average size of said acrylic rubber-like polymer particles (a2) is 400 to 2000 nm.

4. A rubber-reinforced thermoplastic resin according to claim 1, wherein the content of the acrylic rubber-like polymer particles having a size of 300 to 400 nm in the acrylic rubber-like polymer (a) is not more than 20% by weight when the content of the whole acrylic rubber-like polymer particles is supposed to be 100% by weight.

5. A rubber-reinforced thermoplastic resin comprising a copolymer resin (A3) having a graft ratio of 68 to 200% containing an acrylic rubber-like polymer (f) obtained by polymerizing a vinyl monomer (b) in the presence of an acrylic rubber-like polymer (a), the content of said acrylic rubber-like polymer (a) is 5 to 80% by weight, and the weight ratio (wt %) of the particles of said acrylic rubber-like polymer (f) is defined as: (particles having a particle size of less than 350 nm)/(particles having a particle size of not less than 350 nm)=(55 to 98)/(2 to 45).

6. A rubber-reinforced thermoplastic resin composition comprising the rubber-reinforced thermoplastic resin (I) as defined in claim 1 or 5 and a non-diene rubber-like polymer-reinforced thermoplastic resin (II) provided said non-diene rubber-like polymer-reinforced thermoplastic resin (II) contains no rubber-reinforced thermoplastic resin (I), the content of the acrylic rubber-like polymer in the rubber-reinforced thermoplastic resin (I) is 1 to 40% by weight, and the content of the non-diene rubber-like polymer in the non-diene rubber-like polymer-reinforced thermoplastic resin (II) is 1 to 40% by weight;

wherein the non-diene rubber-like polymer-reinforced thermoplastic resin (II) is selected from the group consisting of ethylene-α-olefin random copolymer rubber, ethylene-α-olefin-nonconjugated diene compound random copolymer rubber, hydrogenated diene rubber, polybutadiene rubber, polyisoprene rubber, polychloroprene rubber, styrene-butadiene random copolymer rubber, styrene-isoprene random copolymer rubber, acrylonitrile-butadiene random copolymer rubber, isobutylene-isoprene random copolymer rubber, styrene-butadiene block copolymer rubber, styrene-isoprene block copolymer rubber, styrene-isoprene-styrene block copolymer rubber, and silicone rubber.

7. A rubber-reinforced thermoplastic resin composition according to claim 6, wherein the non-diene rubber-like polymer constituting the non-diene rubber-like polymer-reinforced thermoplastic resin (II) is an ethylene-α-olefinic rubber-like polymer.

8. A rubber-reinforced thermoplastic resin comprising a copolymer resin (A1) having a graft ratio of 68 to 200% and obtained by polymerizing a vinyl monomer (b1) in the presence of an acrylic rubber-like polymer (a), or a mixture of said copolymer resin (A1) and a (co)polymer (A2) of a vinyl monomer (b2), said acrylic rubber-like polymer (a) comprising 55 to 98% by weight of acrylic rubber-like polymer particles (a1) which have a particle size of less than 350 nm and 2 to 45% by weight of acrylic rubber-like polymer particles (a2) which have a particle size of not less than 350 nm, the content of said acrylic rubber-like polymer (a) is 5 to 80% by weight based on said rubber-reinforced thermoplastic resin, said vinyl monomer (b2) containing a maleimide monomer in an amount of 5 to 65% by weight based on the overall amount of said vinyl monomer (b2), the weight-average size of said acrylic rubber-like polymer particles (a1) is 60 to 200 nm, the weight-average size of said acrylic rubber-like polymer particles (a2) is 400 to 2000 nm, and the content of the acrylic rubber-like polymer particles having a size of 300 to 400 nm in the acrylic rubber-like polymer (a) is not more than 20% by weight when the content of the whole acrylic rubber-like polymer particles is supposed to be 100% by weight.

9. A rubber-reinforced thermoplastic resin according to claim 1, wherein said acrylic rubber-like polymer (a) comprises 60 to 98% by weight of acrylic rubber-like polymer particles (a1) having a particle size of less than 350 nm and 2 to 40% by weight of acrylic rubber-like polymer particles (a2).

* * * * *